United States Patent [19]
Lhota

[11] Patent Number: 5,986,212
[45] Date of Patent: Nov. 16, 1999

[54] PLASTIC CHANNEL FOR ELECTRICAL WIRING

[76] Inventor: Thomas E. Lhota, 1390 Lake Nepessing, Lapeer, Mich. 48446

[21] Appl. No.: 08/948,308

[22] Filed: Oct. 9, 1997

[51] Int. Cl.[6] .................................................. H02G 3/04
[52] U.S. Cl. ................................ 174/68.3; 174/95; 52/39
[58] Field of Search ................................ 174/68.1, 68.3, 174/48, 49, 72 C, 98, 95, 97, 72 R; 52/39, 712, 715; 362/148

[56] References Cited

U.S. PATENT DOCUMENTS

| | | | |
|---|---|---|---|
| 1,992,574 | 2/1935 | Jenkins . | |
| 2,368,619 | 2/1945 | Soderberg | 248/65 |
| 2,917,083 | 12/1959 | Duvall et al. . | |
| 3,428,799 | 2/1969 | Bassani | 362/219 |
| 4,720,946 | 1/1988 | Pagliarello | 52/39 |
| 4,838,002 | 6/1989 | Dajnko et al. | 52/475.1 |
| 4,857,670 | 8/1989 | Frank et al. | 174/68.3 |
| 5,004,192 | 4/1991 | Handler . | |
| 5,134,250 | 7/1992 | Caveney et al. | 174/101 |
| 5,212,349 | 5/1993 | Pelzer | 174/98 |
| 5,235,136 | 8/1993 | Santucci et al. . | |
| 5,313,759 | 5/1994 | Chase, III | 52/506.06 |
| 5,423,507 | 6/1995 | Florent et al. | 248/300 |
| 5,501,044 | 3/1996 | Janesky . | |
| 5,523,529 | 6/1996 | Holliday | 174/101 |
| 5,709,249 | 1/1998 | Okada et al. | 138/162 |

FOREIGN PATENT DOCUMENTS

| | | | |
|---|---|---|---|
| 2181206 | 4/1987 | United Kingdom | 174/68.3 |

*Primary Examiner*—Dean A. Reichard
*Assistant Examiner*—Dhiru R. Patel
*Attorney, Agent, or Firm*—Reising, Ethington, Barnes, Kisselle, Learman & McCulloch, P.C.

[57] ABSTRACT

An electrical wire support assembly for routing wire along building interior structures includes a plurality of hangers that suspend electrical wiring from building interior structures. The hangers are fastened to the interior structures in a hanger row that follows a desired wiring path. Each hanger includes a slightly trapezoidal frame section integrally connected to a fastening flange. The hangers are shaped to support electrical wires strung through the frame sections and to allow elongated plastic cover sections to snap over the frame sections. The cover sections conceal and protect the electrical wiring. C-shaped couplers fit collar-like around the joined ends of the cover sections and hold the cover sections together end-to-end. Each fastening flange includes fastener holes for receiving fasteners such as nails or screws. Side walls of each hanger frame section include an integrally outwardly extending horizontal ridge. Side walls of each cover section each include a beveled upper edge and a horizontal groove. The beveled edges help initiate outward splaying of the cover side walls as the covers are being pushed into position over the hanger frame sections. The grooves are shaped and positioned to allow the hanger frame section ridges to snap into the grooves, securing the cover sections to the hanger frame sections.

19 Claims, 2 Drawing Sheets

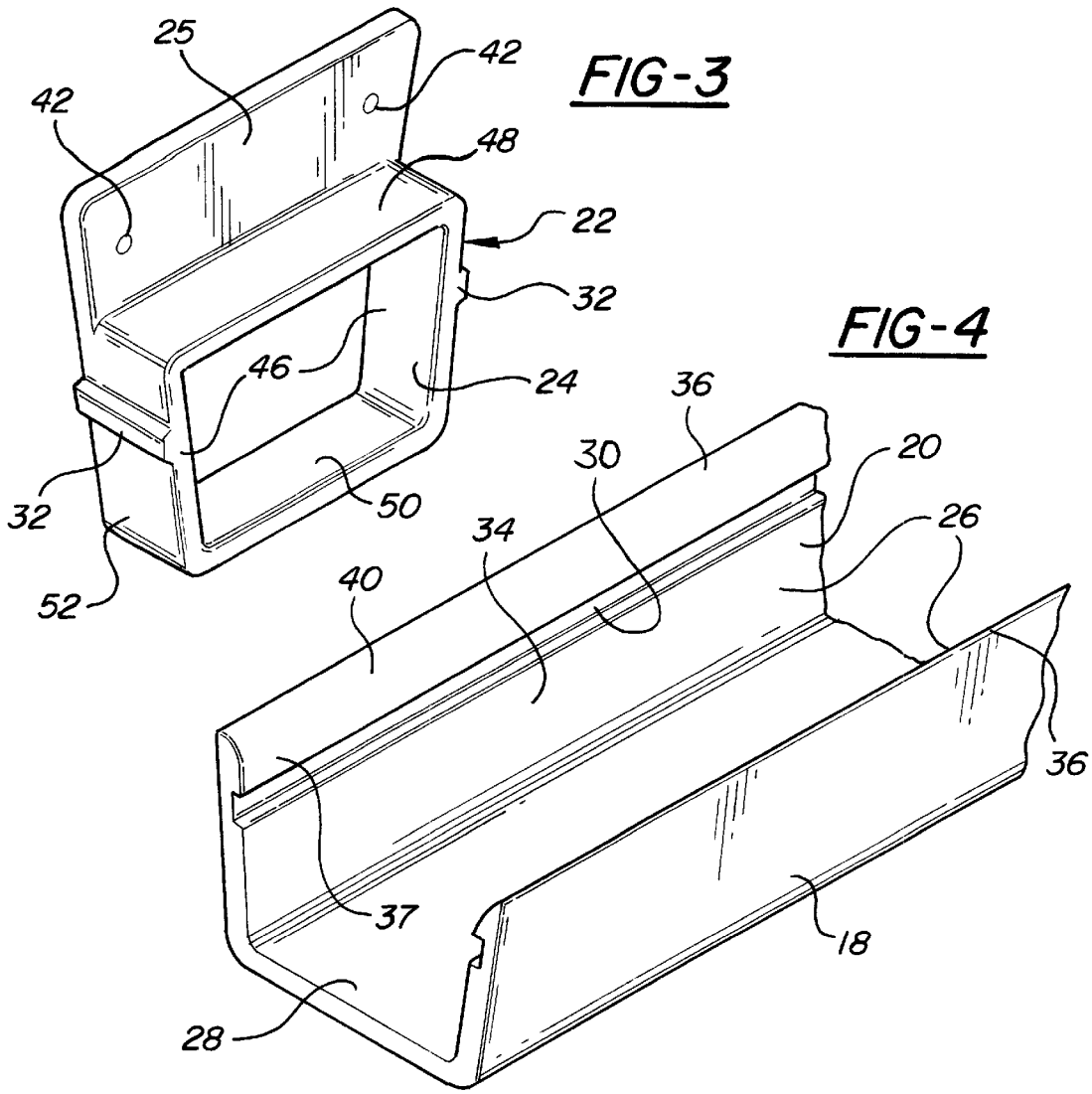
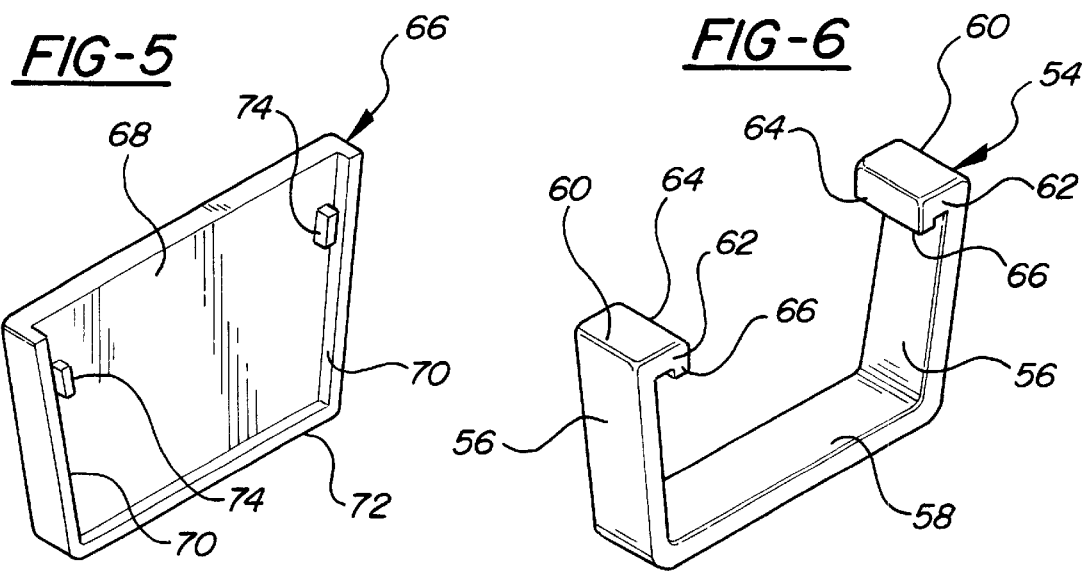

even with 5,986,212

PLASTIC CHANNEL FOR ELECTRICAL WIRING

TECHNICAL FIELD

This invention relates generally to an electrical wiring support assembly and, more particularly, to such an assembly adapted for use in installing electrical wiring in a building.

INVENTION BACKGROUND

Currently, electrical wiring is installed through open areas in building structures by first drilling holes through wooden frame elements such as studs (upright wall supports), joists (long horizontal supports that floor boards or ceiling laths are fastened to), stringers (long horizontal supports) and rafters (sloping roof beams). Wiring is then passed through the drilled holes. This process is time consuming, requires the use of a drill, and weakens the support members that must be drilled-through.

Another common method for supporting wiring in a horizontal orientation within a building without having to drill holes in support members is to simply lay the wiring across the stringers and/or joists that form the unimproved "floor" of an attic. However, attic wiring is often subjected to extreme high and/or low temperatures and may be subjected to substantial temperature swings according to seasonal temperature variations experienced in most parts of the world. Temperature extremes and/or substantial temperature variations of this kind can shorten the life of materials used to insulate electrical wiring. Temperature variations also complicate the wiring design of a building by changing the ampacity ratings of wire conductors. In addition, it is hazardous for workers to attempt to service wiring that is supported in this way. Servicing attic wiring is hazardous because, to reach the wires, workers must sometimes attempt to walk across and stand on unimproved attic flooring, i.e., stringers or floor joists with no actual floorboards covering them.

To facilitate the suspension of electrical wiring in buildings in general and the horizontal suspension of electrical wiring in particular, various types of support apparatus in the form of duct, channel, hanger or conduit systems are employed. Such suspension means allow installers to route and support wires beneath frame structures such as ceiling joists and stringers that are disposed above inhabited, temperature-controlled areas of a building—areas that service personnel can more readily gain access to.

One example of such a system is disclosed in U.S. Pat. No. 2,917,083 issued Dec. 15, 1959 to Duvall et al. The Duvall et al. system includes a fully enclosed duct used in commercial construction to support electrical wires. A generally rectangular-shaped coupler connects lengths of the duct end-to-end. Duvall et al. also discloses a duct hanger having a fastening flange with holes through which fasteners such as nails may be driven into an external support structure such as a wooden joist or stringer. The system also includes an end-cap section for closing-off the open end of a duct. Each of the above components of the Duvall et al. system is made of sheet metal—a material that can be expensive and difficult to form and that can present problems in electrical wiring applications due to its high conductivity and characteristically sharp edges. In addition the hangers are two-piece L-shaped units that are relatively difficult to install, as they must be fastened together and to the duct using separate fastening hardware. The couplers are also relatively difficult to install and are also difficult to construct. The couplers are difficult to construct because they must be cut or stamped from sheet metal in two pieces then joined together at a hinged connection. The couplers are difficult to install because they must be fastened within and between two lengths of duct by separate fastening hardware. Still further, these hangers are limited in that they must be positioned at joints between duct lengths to engage studs also used to connect the couplers to the duct ends. In addition, because a completely enclosed duct supports the wiring, the system cannot be used to route certain types of nonmetallic sheathed cable without violating Article 336 of the National Fire Protection Association (NFPA) National Electrical Code. Specifically, types NM and NMC nonmetallic sheathed cable may not be supported within enclosed ducting. Unfortunately, NM-type cable is very common in residential home construction.

Another example of such a system is disclosed in U.S. Pat. No. 1,992,574 issued Feb. 26, 1935 to Jenkins. Similar to the Duvall et al. system, the Jenkins system includes fully enclosed duct sections with box-shaped cross-sections used in commercial construction to support electrical wires. Couplers in the form of end flanges integrally formed at the ends of each length of the duct are configured to join duct sections. Jenkins also discloses a duct hanger with a generally rectangular frame section and an integral fastening flange with holes through which fasteners such as nails may be driven into an external support structure. The system also includes an end-cap section for closing-off the open end of a duct. As with the Duvall et al. system, each of the above components is made of sheet metal and therefore has all the same attendant limitations. The Jenkins hangers are single piece units but must be fastened to end-flange portions of the ducts using separate fastening hardware. The coupler flanges make the duct forming process more difficult as they extend integrally outward from the ends of the ducts. To couple separate lengths of duct the end flanges are fastened together using separate fastening hardware. In addition, the hangers must be assembled to the duct at the same time as the duct lengths are being joined together. This is because the hangers must be positioned between the end flanges and are held in place by the same fastening hardware that joins the end flanges together. As with the Duvall et al. system, the fully enclosed duct of the Jenkins system makes it incompatible with certain non-metallic sheathed cable.

Because of the inherent problems associated with using metal components to support electrical wiring, some current systems include wire suspension components made of plastic. One such system is disclosed in U.S. Pat. No. 4,857,670, issued Aug. 15, 1989 to Frank et al. Frank et al. discloses fully enclosed PVC duct sections for supporting electrical wiring. Couplers in the form of tabs join the duct sections together end-to-end. Opposite ends of each tab are slidably received into grooves formed within each end of each duct section. The tabs and grooves are configured to join duct sections end-to-end in either linear fashion or at right angles. The duct sections include an integrally hinged cover that snaps into place over a U-shaped trough to form the fully enclosed duct with a generally rectangular cross-section. The grooves, the hinged cover and the snap-fit connection of each duct section are relatively complex and difficult to extrude or mold. In addition, the Frank et al. system has the same incompatibility problem with certain types of non-metallic sheathed cable as do the Duvall et al. and Jenkins systems.

What is needed is an electrical wiring support assembly that is inexpensive to manufacture and easy to assemble and install without weakening building structures. What is also needed is such an assembly that can be used with types NM and NMC non-metallic sheathed cable without violating the NFPA National Electrical Code. Also needed is such an assembly that does not create or increase the risk of short-circuiting the electrical wires that it supports.

INVENTION SUMMARY

In accordance with this invention an electrical wire support assembly for supporting electrical wire on building interior structures is provided that comprises a hanger configured to support electrical wires. The hanger includes a frame section and a fastening flange connected to the frame section. The frame section is configured to support electrical wires and an elongated non-metallic cover section that conceals electrical wires supported on the hanger. The fastening flange is configured to secure the hanger to a building interior structure.

According to another aspect of the invention the cover section is configured to fit over the hanger frame section. This configuration allows an installer to snap the cover into place after installing the hanger and running the wire through the hanger.

According to another aspect of the invention the cover section has a generally U-shaped cross-section. The U-shaped cross section defines an elongated inner channel. The frame section of the hanger is disposed in the inner channel of the cover section.

According to another aspect of the invention the assembly includes at least one additional elongated plastic cover section. The assembly also includes at least one additional hanger and at least one coupler configured to join the abutting ends of two cover sections together in an end-to-end disposition.

According to another aspect of the invention each coupler comprises a collar configured to receive and join the abutting ends of two adjacent cover sections. This exterior collar configuration allows an installer to snap the collars into place over abutted ends of cover sections that have already been installed over the hanger frame sections and positioned end-to-end along the wiring path.

According to another aspect of the invention each coupler has a generally C-shaped cross-section slightly larger than that of the cover sections. The slightly larger cross-section allows the couplers to fit around the abutted ends of the cover sections.

According to another aspect of the invention each coupler includes a pair of parallel coupler side walls that extend integrally and generally perpendicularly upward from a coupler base. Each coupler side wall has an upper edge. A projection of a first pair of projections extend integrally and generally perpendicularly inward from the respective end wall upper edges to respective inner ends of the first pair of projections. Each projection of the first pair of projections extends over and engages a cover side wall upper edge, preventing the cover section ends from lifting out of the coupler. The first projection inner ends are spaced apart to define an upper coupler opening.

According to another aspect of the invention each coupler includes a second pair of projections extending integrally and generally perpendicularly downward from respective inner ends of the first pair of projections. The downward projections further secure the coupler to the cover side wall upper edges.

According to another aspect of the invention each hanger includes a horizontal ridge that extends integrally outwardly from along a portion of the frame section of each hanger. The inner channel of each cover section includes a longitudinal groove that is shaped and positioned to receive the frame section ridges. The ridges and channels cooperate to allow the cover sections to be snapped into position over the hanger frame sections.

According to another aspect of the invention the U-shaped cross-section of each cover section has generally parallel cover side walls that extend generally perpendicularly upward from a cover base. Upper edges of the side walls define a longitudinal upper opening in each cover section. The cover grooves are disposed in and along respective opposite inner side surfaces of the respective opposite cover side walls. Each hanger frame section has generally parallel frame side walls that extend generally perpendicularly between parallel upper and lower frame walls to form a generally rectangular shape. The horizontal longitudinal ridges extend integrally outwardly from along respective outer surfaces of the respective frame side walls. The frame side walls and ridges are positioned to engage the respective cover side walls and grooves. The lower frame wall is positioned to engage the cover base. Each coupler has a generally rectangular aperture shaped to receive abutting cover section ends.

According to another aspect of the invention the assembly includes at least one end-cap configured to attach to an end of a cover section and close-off an end of the cover channel.

According to another aspect of the invention each end-cap includes a pair of tabs engageable with the distal ends of respective elongated grooves of a cover section.

According to another aspect of the invention the frame section and fastening flange section of the hanger are integrally formed as a single unitary piece.

According to another aspect of the invention at least one hole extends through a thickness of the fastening flange. The holes are included to receive fasteners such as nails or screws used to attach the hanger to interior building structures.

According to another aspect of the invention the coupler, hanger and end cap are made of plastic. The use of plastic reduces the risk of electrical short circuits and damage to electrical insulation from sharp metal edges.

According to another aspect of the invention a method is provided for installing an electrical wire support assembly on building interior structures. The method includes the steps of attaching the fastening flange of a hanger to a building interior structural member along a desired electrical wiring path. Electrical wiring is then passed-through and supported within the hanger frame section and the cover section is engaged onto the hanger frame section.

According to another aspect of the invention the above method includes the provision of at least one additional hanger, cover section and coupler. The fastening flanges of the additional hangers are attached to building interior structural members at spaced points along the electrical wiring path. The fastening flanges of the additional hangers are attached to building interior structural members at spaced points along the electrical wiring path. The electrical wire is then passed-through and supported in the additional hanger frame section. The cover sections are then engaged onto the hanger frame sections and are joined by providing the couplers over the abutted ends of the cover sections.

BRIEF DRAWING DESCRIPTION

To better understand and appreciate the invention, refer to the following detailed description in connection with the accompanying drawings:

FIG. 3 is a perspective view of a hanger portion of the electrical wire support assembly of FIG. 1;

FIG. 4 is a fragmentary perspective view of a cover portion of the electrical wire support assembly of FIG. 1;

FIG. 5 is a perspective view of an end cap portion of the electrical wire support assembly of FIG. 1; and FIG. 6 is a perspective view of a coupler portion of the electrical wire support assembly of FIG. 1.

PREFERRED EMBODIMENT DESCRIPTION

Figure 1:
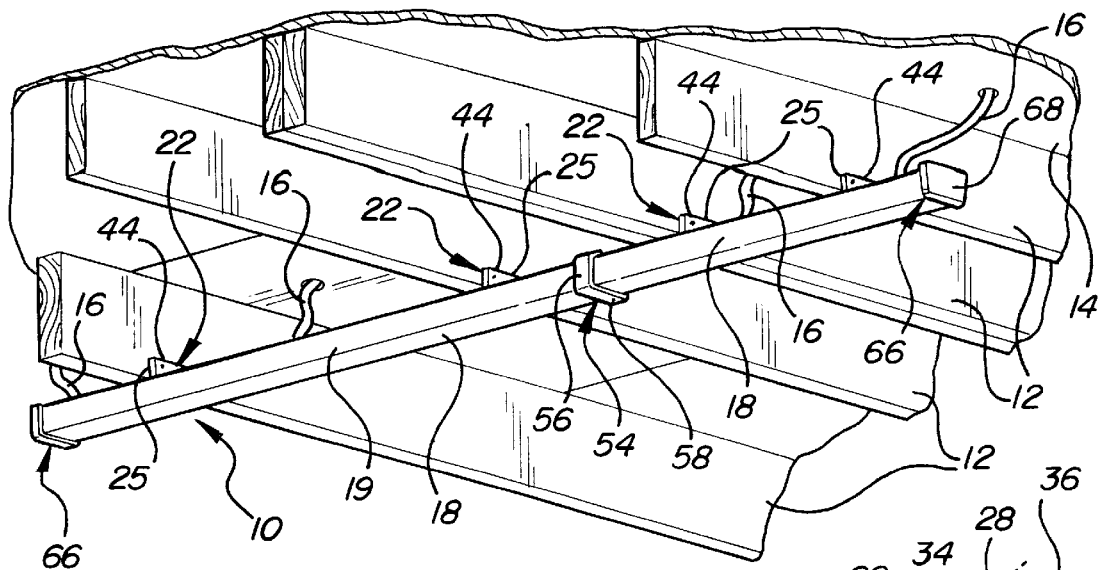
FIG. 1 is a perspective bottom view of an electrical wire support assembly constructed according to the invention and fastened beneath a row of floor joists.
Figure 2:
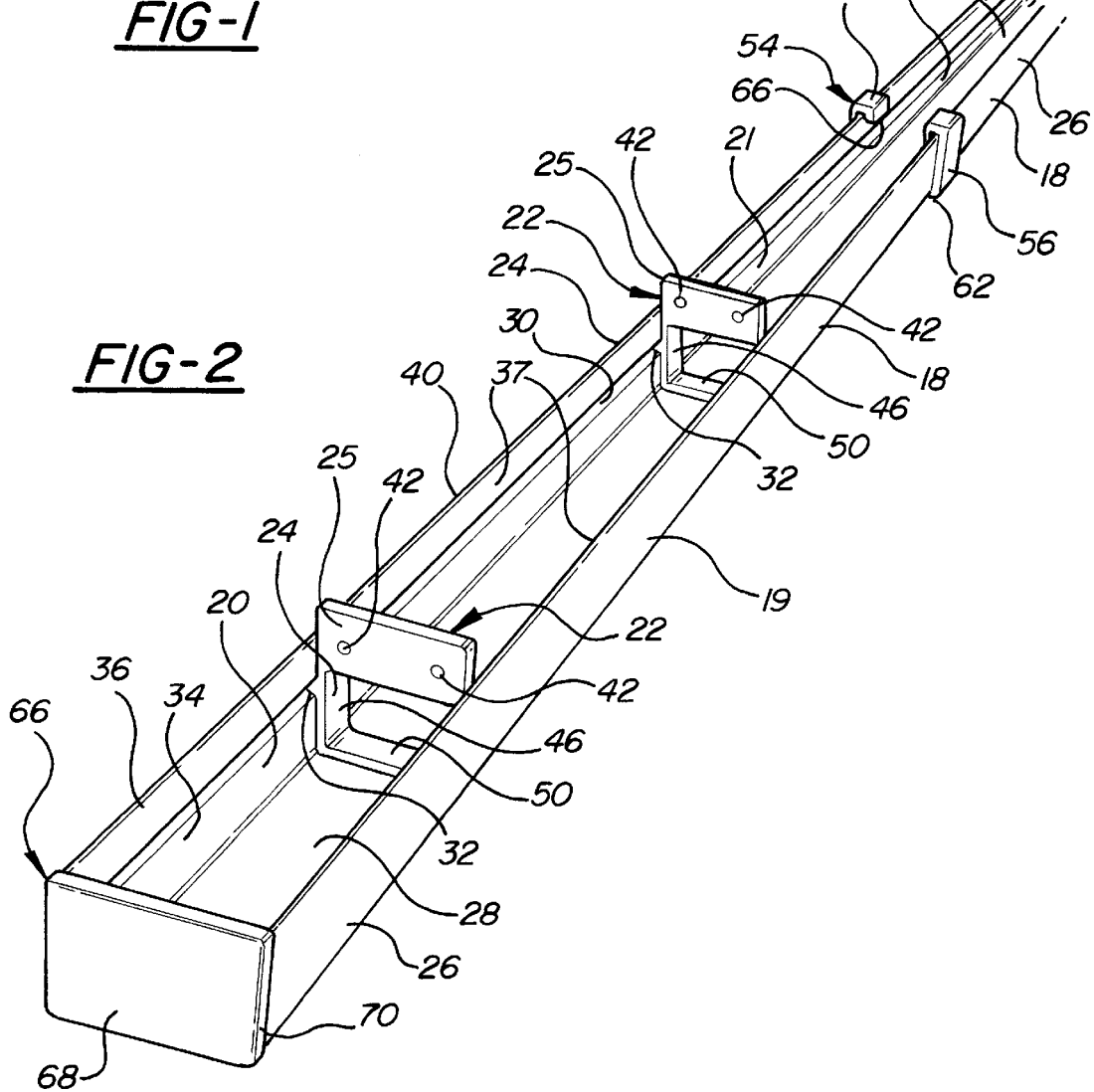
FIG. 2 is a fragmentary perspective top view of the electrical wire support assembly of FIG. 1 with wires removed.

An electrical wire support assembly for supporting electrical wire on building interior structures is generally shown at 10 in FIGS. 1 and 2. In FIG. 1 the assembly 10 is shown fastened across a row of floor joists 12 that support a portion of a floor 14 in a building. The assembly 10 is also shown supporting and concealing suspended portions of electrical wires 16. FIG. 2 shows the assembly 10 alone with electrical wires 16 removed for clarity. As shown in both FIG. 1 and FIG. 2 the assembly 10 comprises a plurality of elongated plastic cover sections 18 arranged end-to-end in a cover section string 19. Each cover section 18 includes a longitudinal channel 20 configured to conceal and protect lengths of electrical wire 16 that the assembly 10 supports. As is best shown in FIG. 2, when the cover sections 18 are joined together, the cover channels 20 are aligned end-to-end into a single composite channel 21. The assembly 10 additionally comprises a plurality of hangers, generally indicated at 22 in FIGS. 1–3. Each hanger 22 includes a frame section 24 and a fastening flange 25 connected to the frame section 24. The hanger frame sections 24 are configured to support both the electrical wires 16 and the cover sections 18. The fastening flanges 25 are configured to secure the hangers 22 to one or more building interior structures such as stringers or joists 12 to form a row of hangers 22 aligned with a desired electrical wiring path.

As shown in FIGS. 2 and 4, each cover section 18 has a uniform, generally U-shaped cross-section along its length that defines the elongated inner channel 20. The U-shaped cross-section of each cover section 18 is formed by a pair of generally parallel cover side walls 26 that extend generally perpendicularly upward from a cover base wall 28. Although the cover side walls 26 are generally perpendicular to the cover base wall 28, they have a slight outward splay. The cover side walls 26 lean outwardly from the vertical by approximately 1°/30' to aid in allowing an installer to push the cover sections 18 into position over the hanger frame sections 22. The cover side and base walls 26, 28 form rounded corners where they join together. Upper edges 36 of the cover side walls 26 define a longitudinal upper channel opening 40 into the channel 20. The inner facing portions 37 of the upper edges 36 are beveled to further aid in allowing an installer to push the cover sections 18 into position over the hanger frame sections 22. The cover sections 18 may be cut to any length to accommodate various construction requirements.

The elongated inner channel 20 of each cover section 18 includes two longitudinal grooves shown at 30 in FIGS. 2 and 4. The cover section grooves 30 are shaped and positioned to receive two hanger ridges shown at 32 in FIGS. 2 and 3 when an installer pushes the cover sections 18 into position over the duct frame sections 24. The ridges 32 are formed on respective outer surfaces 52 of respective frame side walls 46 of each hanger frame section 24. The cover grooves 30 run the entire length of the cover sections 18 and are disposed in and along respective inner side surfaces 34 of each side wall parallel to respective cover side wall upper edges 36. The cover grooves 30 are cut into their respective side walls 26 approximately ⅓ the distance from the respective side wall upper edges 36 to the cover base wall 28. The grooves 30 and ridges 32 cooperate to support the cover sections 18 on the frame sections 24 of the hangers 22.

The frame section 24 of each hanger 22 can engage a cover section 18 at any point along the length of the cover section 18 as shown in FIG. 2. This gives an installer the freedom to position hangers 22 wherever support members happen to be located while cutting cover sections to any convenient length as shown in FIG. 1. In other words, an installer need not be concerned with positioning hangers 22 or cutting cover sections 18 in such a way as to align hangers 22 with discrete attachment points along or between cover sections 18.

The frame section 24 of each hanger 22 is disposable within the inner channel 20 of a cover section 18 as shown in FIG. 2. The hanger fastening flanges 25 extend out through the longitudinal upper channel opening 40 defined by the open end of the U-shaped cover cross section. The hanger fastening flanges 25 protrude from the covers 18 to allow installers to attach the hangers 22 to building structural members such as joists 12 or stringers. Two fastener holes 42 extend through a thickness of each fastening flange 25. The fastener holes 42 receive fasteners such as nails 44 or screws that are used to attach the hangers 22 to support structures.

As best shown in FIG. 4, each hanger frame section 24 has generally parallel frame side walls 46 that extend generally perpendicularly between parallel upper and lower frame walls 48, 50 to form a generally rectangular shape. While the frame side walls 46 are generally parallel to one another, they actually splay slightly outwardly from each other. The frame side walls 46 of the present embodiment lean outward by approximately 1°/30' from the vertical. Therefore, the shape of the frame section 24 is generally rectangular, but is slightly trapezoidal.

The horizontal longitudinal ridges 32 extend integrally outwardly from along respective outer surfaces 52 of the respective frame side walls 46 of each hanger 22 as shown in FIG. 3. Each ridge 32 is generally rail shaped and has a generally rectangular cross-section with slightly rounded corners. The ridges 32 run parallel to the upper and lower walls 48, 50 of the generally rectangular (though slightly trapezoidal) hanger frame section 24 and extend along the entire length of their respective frame side walls 46. The ridges 32 are disposed approximately one-third the distance from the top to the bottom of their respective frame side walls 46.

The frame side walls 46 and ridges 32 are positioned to engage the respective cover side walls 26 and grooves 30. The lower frame wall 50 is positioned to engage the cover base wall 28. The frame section walls 46, 48, 50 define a generally rectangular frame channel that electrical wires 16 are passed through and supported from. The frame section 24 and fastening flange section 25 of each hanger 22 are integrally formed as a single unitary piece.

As is generally indicated FIGS. 1, 2 and 6, the assembly 10 includes a plurality of couplers 54. Each coupler 54 is configured to join the ends of two cover sections 18 together end-to-end to form a cover section string 19. Each coupler 54 comprises a collar configured to receive and join the abutting ends of two cover sections 18. In other words, the couplers 54 hold the abutted ends of the cover sections 18 together and conceal the seam formed between the abutted cover section ends.

As best shown in FIG. 6, each coupler 54 has a generally C-shaped cross-section slightly larger than the U-shaped cross-section of the cover sections 18. The inner dimensions of the coupler 54 are either approximately the same or slightly larger than the corresponding outer dimensions of the cover sections 18 so that the cover section ends can slide into the coupler 54. The cover ends are held in place within the couplers 54 either by an interference fit or by the application of a layer of adhesive between inner surfaces of the coupler 54 and outer surfaces of the joined ends of the cover sections 18.

Each coupler 54 includes a pair of generally parallel coupler side walls 56 that extend integrally and generally perpendicularly upward from a coupler base wall 58. The coupler side walls 56 and base wall 58 form rounded corners where they join. Each coupler side wall 56 has an upper edge 60 and a first pair of projections 62 that extend integrally and generally perpendicularly inward from the respective end wall upper edges 60 and terminate at respective inner ends 64 of the first pair of projections 62. The first pair of inward projections 62 are positioned to engage, i.e., to hook over cover section side wall upper edges 36 and thereby prevent couplers 54 from dropping off the cover sections 18. The first projection inner ends 64 are spaced apart to define an upper coupler opening.

Each coupler 54 includes a second, shorter pair of projections 66 that extend integrally and generally perpendicularly downward a short distance from respective inner ends 64 of the first pair of projections 62. The second pair of projections 66 further secure the coupler 54 to the cover side wall upper edges 36 by hooking onto the inner surfaces 34 of the cover section channels 20 and thereby resisting outward splaying of the coupler side walls 46.

The assembly 10 includes generally rectangular end-caps generally indicated at 66 in FIGS. 1, 2 and 5. The end-caps 66 are configured to attach over the ends of a cover section string 19 and close-off open ends of the cover channels 20. Each end cap 66 includes a cap end wall 68 and two generally parallel cap side walls 70 that extend axially outward from the end wall 68 and integrally upward from a cap base wall 72. The cap base wall 72 also extends integrally and axially outward from along a base edge of the cap end wall 68. While the cap side walls 70 may be described as being generally parallel, they are actually slightly splayed to match the configuration of the cover sections 18. Each cap side wall 70 is tilted slightly outward from the vertical by approximately 1°/30'. Consequently, the shape of each cap end wall 68 is generally rectangular but is slightly trapezoidal.

The cap side walls 70 and base wall 72 have interior dimensions that match or are slightly larger than the outer dimensions of the ends of the cover sections 18. Therefore, when an end cap 66 is assembled to a cover section 18, it fits over the end of the cover section 18. Each end-cap 66 also includes a pair of axially extending tabs 74 that fit within the distal ends of respective elongated grooves 30 of a cover section 18.

The cover sections 18, couplers 54, hangers 22 and end caps 66 are made of a non-metallic material such as plastic.

In practice, an electrical wire support assembly 10 constructed according the present invention is installed on building interior structures by first nailing or screwing the fastening flanges 25 of the hangers 22 to building interior structural members such as stringers or joists 12. The hangers 22 are attached to the structural members at spaced points along a desired electrical wiring path. Electrical wires are then strung through and suspended from the frame sections of the hangers 22. The cover sections 18 are then snapped into place over the hanger frame sections in an end-to-end disposition with their respective ends abutting one another. The couplers 54 are then snapped over the abutted ends of the cover sections. An adhesive may be introduced between the couplers 54 and the cover sections 18 to further strengthen the joints and to prevent the couplers 54 from sliding lengthwise out of position. At some point in the assembly process, end caps 66 are pushed into place over the open channel ends at each respective end of the string 19 of pre-joined cover sections 18. As with the couplers 54, an adhesive may be introduced between the end caps 66 and the ends of the cover sections 18.

The above description and drawings illustratively set forth my presently preferred invention embodiments. I intend the description and drawings to describe an embodiment of the invention rather than to limit the scope of the invention. Obviously, it is possible to modify this embodiment while remaining within the scope of the following claims. Therefore, within the scope of the claims, one may practice the invention otherwise than as the description and drawings specifically show and describe.

I claim:

1. An electrical wire support assembly for supporting electrical wire on building interior structures; the assembly comprising:
   a hanger including a frame section and including a fastening flange extending integrally from the frame section, the frame section configured to support electrical wire, the fastening flange configured to secure the hanger to a building interior structure; and
   an elongated non-metallic cover section configured to engage the frame section and conceal electrical wire supported in the frame section.

2. An electrical wire support assembly as defined in claim 1 in which the cover section is configured to fit over the hanger frame section.

3. An electrical wire support assembly as defined in claim 2 in which the cover section has a generally U-shaped cross-section defining an elongated inner channel and the frame section of the hanger is disposed in the inner channel of the cover section.

4. An electrical wire support assembly as defined in claim 3 further including:
   at least one additional elongated cover section;
   at least one additional hanger; and
   at least one coupler configured to join the ends of the cover sections together end-to-end.

5. An electrical wire support assembly as defined in claim 4 in which at least one of the coupler comprises a collar configured to receive and join the ends of the cover sections.

6. An electrical wire support assembly as defined in claim 5 in which at least one of the coupler has a generally C-shaped cross-section slightly larger than that of the cover sections.

7. An electrical wire support assembly as defined in claim 6 in which at least one of the coupler includes:
   a pair of parallel coupler side walls extending integrally and generally perpendicularly upward from a coupler base wall, at least one of the coupler side wall having an upper edge; and a first pair of projections extending integrally and generally perpendicularly inward from the respective end wall upper edges to respective inner ends of the projections, the first projection inner ends being spaced apart to define an upper coupler opening.

8. An electrical wire support assembly as defined in claim 7 in which at least one of the coupler includes a second pair of projections extending integrally and generally perpendicularly downward from respective inner ends of the first pair of projections.

9. An electrical wire support assembly as defined in claim 4 in which:

each of the hangers includes a horizontal ridge that extends integrally outwardly from along a portion of the frame section of each of the hangers; and the inner channel of each cover section includes a longitudinal groove that is shaped and positioned to receive a hanger frame section ridge.

10. An electrical wire support assembly as defined in claim 9 in which:

the U-shaped cross-section of each of the cover sections has generally parallel cover side walls that extend generally perpendicularly upward from a cover base wall, upper edges of the side walls defining a longitudinal upper opening, at least one of the side walls of the covers having a groove being disposed in and along the inner side surface of each side wall;

each hanger frame section has generally parallel frame side walls that extend generally perpendicularly between parallel upper and lower frame walls to form a generally rectangular shape, a horizontal longitudinal ridge extending integrally outwardly from along an outer surface to each of the frame side walls, the frame side walls and ridges being positioned to engage the respective cover side walls and grooves, the lower frame wall being positioned to engage the cover base wall; and at least one of the coupler is shaped to receive the abutting ends of adjacent cover sections.

11. An electrical wire support assembly as defined in claim 4 further including an end-cap configured to attach to an end of the cover section and close-off an end of the cover channel.

12. An electrical wire support assembly as defined in claim 11 in which the end-cap includes:

a pair of axially-extending tabs engageable with the distal ends of respective elongated grooves of the cover section.

13. An electrical wire support assembly as defined in claim 1 in which the frame section and fastening flange section of the hanger are integrally formed as a single unitary piece.

14. An electrical wire support assembly as defined in claim 1 in which at least one hole extends through a thickness of the fastening flange.

15. An electrical wire support assembly as defined in claim 11 in which at least one of the coupler, hanger and end cap are made of a non-metallic material.

16. An electrical wire support assembly as defined in claim 11 in which at least one of the coupler, hanger and end cap are made of plastic.

17. An electrical wire support assembly for supporting electrical wire on building interior structures; the assembly comprising:

at least two elongated non-metallic cover sections, each of the cover sections having a generally U-shaped cross-section defining an elongated inner channel for concealing a length of electrical wiring;

at least one coupler comprising a collar configured to receive the ends of two abutting cover sections, the collar having a generally C-shaped cross section slightly larger than that of the cover sections;

a hanger including a frame section and including a fastening flange integrally connected to the frame section, the frame section configured to support the length of electrical wiring and to engage the inner channel of each of the cover sections, the fastening flange configured to secure the hanger to a building interior structure, the hanger including a horizontal ridge that extends integrally outwardly from along a portion of the frame section of hanger, the inner channel of each of the cover sections including a longitudinal groove that is shaped and positioned to receive the hanger frame section ridge.

18. A method for installing an electrical wire support assembly on building interior structures, the assembly comprising a hanger including a frame section and including a fastening flange integrally extending from the frame section, the frame section configured to support the electrical wire and to engage the cover section, the fastening flange configured to secure the hanger to a building interior structure, the assembly further comprising an elongated non-metallic cover section configured to engage the frame section and to conceal the electrical wire supported in the frame section; the method including the steps of:

attaching the fastening flange of the hanger to a building interior structural member along a desired electrical wiring path;

providing an electrical wire in the hanger; and engaging the cover section onto the hanger frame section.

19. The method of claim 18 including the additional steps of:

providing at least one additional hanger;

providing at least one additional cover section;

providing at least one coupler configured to join cover section ends together; attaching the fastening flanges of the additional hangers to building interior structural members at spaced points along the electrical wiring path;

the step of providing the electrical wire including the step of providing the electrical wire in the additional hanger frame section;

the step of engaging the cover sections including the steps of:

engaging the additional cover section onto the hanger frame sections; and joining the cover sections by providing at least one of the couplers over the abutted ends of the cover sections.

* * * * *